US009698623B2

(12) United States Patent
Adams et al.

(10) Patent No.: US 9,698,623 B2
(45) Date of Patent: Jul. 4, 2017

(54) INTEGRATED MOBILE PHONE CASE AND CHARGER

(71) Applicants: Michael Adams, Decatur, AL (US); Renee Adams, Decatur, AL (US); Raziq Yaqub, Stewartsville, NJ (US)

(72) Inventors: Michael Adams, Decatur, AL (US); Renee Adams, Decatur, AL (US); Raziq Yaqub, Stewartsville, NJ (US)

( * ) Notice: Subject to any disclaimer, the term of this patent is extended or adjusted under 35 U.S.C. 154(b) by 0 days.

(21) Appl. No.: 15/406,112

(22) Filed: Jan. 13, 2017

(65) Prior Publication Data

US 2017/0149270 A1    May 25, 2017

Related U.S. Application Data

(63) Continuation-in-part of application No. 14/161,647, filed on Jan. 22, 2014.

(51) Int. Cl.
| | | |
|---|---|---|
| *H02J 7/35* | (2006.01) | |
| *H02J 7/02* | (2016.01) | |
| *H02J 7/00* | (2006.01) | |
| *H04M 1/02* | (2006.01) | |
| *H04B 1/3883* | (2015.01) | |
| *H04B 1/3888* | (2015.01) | |

(52) U.S. Cl.
CPC ............ *H02J 7/355* (2013.01); *H02J 7/0044* (2013.01); *H02J 7/025* (2013.01); *H04B 1/3883* (2013.01); *H04B 1/3888* (2013.01); *H04M 1/0274* (2013.01)

(58) Field of Classification Search
CPC . H02J 7/355; H02J 7/004; H02J 7/025; H04B 1/3883; H04B 1/3888
See application file for complete search history.

(56) References Cited

U.S. PATENT DOCUMENTS

| | | | | |
|---|---|---|---|---|
| 2011/0117974 | A1* | 5/2011 | Spitalnik | H01R 31/06 455/573 |
| 2014/0203661 | A1* | 7/2014 | Dayan | H01F 38/14 307/104 |
| 2015/0207360 | A1* | 7/2015 | Adams | H02J 7/35 320/101 |
| 2016/0036267 | A1* | 2/2016 | Yang | H02J 7/0044 320/101 |
| 2016/0315652 | A1* | 10/2016 | Tabatabai | H04M 1/03 |

* cited by examiner

*Primary Examiner* — Tuan Pham
(74) *Attorney, Agent, or Firm* — The Keys Law PLLC

(57) ABSTRACT

An integrated mobile phone case and charger for providing both a protective casing for a mobile device which includes an integrated solar cell for charging the battery of the mobile device therein comprises a case body defined by a front piece and a back piece, with the back piece including solar cells, electrical wiring, and a charging port. The front piece and back piece are configured to releasable attached to each other to form an enclosure in which a mobile phone or other mobile device is placed and secured. The solar cells electricity to be generated to be supplied to the battery of a mobile device disposed in the integrated mobile phone case and charger. A thermoelectric cooler and an electronics control unit may additionally be included in the case body to enable selective charging and cooling of a mobile device with the generated electricity.

13 Claims, 6 Drawing Sheets

INTEGRATED MOBILE PHONE CASE AND CHARGER

CROSS REFERENCE TO RELATED APPLICATIONS

This application is a continuation in part of, claims the benefit of, and incorporates by reference co-pending U.S. patent application Ser. No. 14/161,647, filed Jan. 22, 2014.

BACKGROUND OF THE INVENTION

Field of the Invention

This invention relates generally to mobile phone accessories and, more particularly, to a protective case for a mobile phone which includes an integrated solar cell for charging the mobile phone battery.

Description of the Prior Art

The use of mobile communication devices (or mobile devices), such as PDAs, cell phones (or smart phones, or mobile phones), and tablet computers, is well known. It is understood that such devices must be supplied with electricity to power their operations. Consequently, rechargeable batteries are typically utilized to enable the provisions of electrical power while not substantially compromising the mobile aspect of such mobile devices.

A problem which still exists, however, is that the use of rechargeable batteries inherently requires the battery be recharged in order for it to continue to supply the mobile device with electrical power. Recharging is typically accomplished through the use of battery chargers which plug into a port on the mobile device and to an electrical outlet to facility the transfer of electrical power from the electrical outlet for storage in the battery. When a mobile device is plugged in to a battery charger which is plugged into a wall electrical outlet, however, it essentially becomes tethered to the wall and its mobile aspect is lost for the duration of time the battery is recharged. Thus, there remains a need for an integrated mobile phone case and charger which enables the battery of a mobile device to be recharged without being connected to a wall electrical outlet or otherwise tethering the mobile device to a fixed location. It would be helpful if such an integrated mobile phone case and charger was embodied as a case adapted to additionally provide protection for the mobile device from physical damage. It would be additionally desirable for such an integrated mobile phone case and charger to utilized solar cells which converted light to electricity to be used to recharge the battery on the mobile device. An added advantage of this would be to the stranded user who feels helpless to make a call because the battery is dead The Applicant's invention described herein provides for a mobile phone case and charger adapted to harvest ambient or supplied light energy and supply electricity therefrom to a mobile device as well as transfer heat away from the mobile device to facilitate more efficient operation. The primary components of Applicant's integrated mobile phone case and charger include a hard rubber mobile phone case having built in solar cells, a thermoelectric cooler, and an integrated microprocessor to control to the desired operations. When in operation, the integrated mobile phone case and charger allows a mobile device on which it is disposed to become essentially self sustaining through improved efficiency and an ongoing conversion of light to electricity to be provided to the battery. As a result, many of the limitations imposed by the mobile device battery charging systems are removed.

SUMMARY OF THE INVENTION

An integrated mobile phone case and charger for providing both a protective casing for a mobile device which includes an integrated solar cell for charging the battery of the mobile device therein. The integrated mobile phone case and charger comprises a case body, providing a cover means for encasing a mobile device, which includes solar cells, electrical wiring, and a charging port. The case body is defined by a front piece and a back piece, which are configured to be releasable attached through the operation of a plurality of fasteners to each other to form an enclosure in which a mobile phone or other mobile device is placed and secured. The solar cells enable the integrated mobile phone case and charger to generate its own electrical energy to be supplied to the battery of a mobile device disposed in the integrated mobile phone case and charger. In this regard, the solar cells provide a cell means for converting light into electricity. Electricity generated by the solar cells is carried through electrical wires mounted on the inside surface of the back piece to a charging port, where it is provided to the mobile device. Thus, the charging port provides a port means for providing electricity to an encased mobile device and the electrical wires provide a means for directing electricity from the cell means to the port means. The charging port and the electrical wires are mounted on the inside surface of the back piece. Thus, other than the solar cells on the exterior of the back piece, exterior of the integrated mobile phone case and charger is substantially indistinguishable from many protective cases in the prior art.

In an embodiment of the integrated mobile phone case and charger, a thermoelectric cooler operative to cool a stored mobile device is additionally included on the inside surface of the back piece.

In an embodiment of integrated mobile phone case and charger, an induction coil operative to enable wireless charging of a stored mobile device is included on the inside surface of the back piece, either in addition to or as opposed to the electrical wires and charging port.

In an embodiment of integrated mobile phone case and charger, an integrated controller operative to control the supply of generated electricity to a stored mobile device or a thermoelectric cooler is additionally included on the inside surface of the back piece It is an object of this invention to provide an integrated mobile phone case and charger which enables the battery of a mobile device to be recharged without being connected to a wall electrical outlet or otherwise tethering the mobile device to a fixed location.

It is another object of this invention to provide an integrated mobile phone case and charger embodied as a case adapted to additionally provide protection for the mobile device from physical damage.

It is yet another object of this invention to provide an integrated mobile phone case and charger to optimize charging efficiency through temperature control.

It is another object of this invention to provide the location information of the device (and the user) to his emergency contact in case the user is stranded and cannot communicate just because the battery is dead.

It is yet another object of this invention to provide an integrated mobile phone case and charger to optimize charging efficiency through a software application.

These and other objects will be apparent to one of skill in the art.

DETAILED DESCRIPTION OF THE INVENTION

Figure 1A:
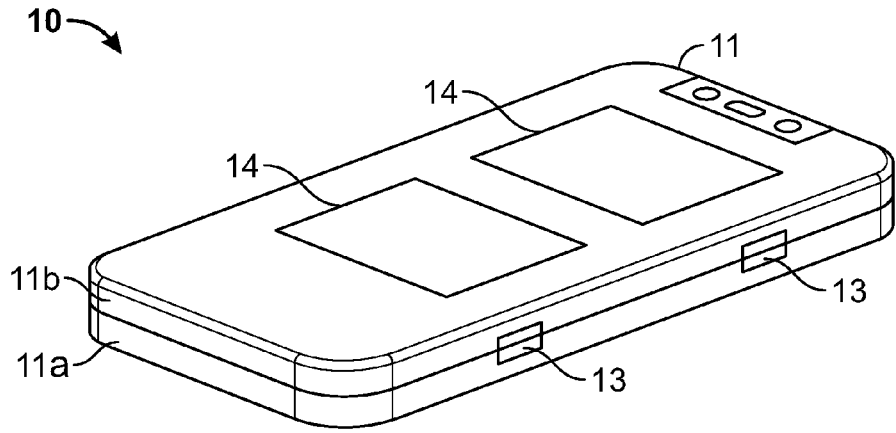
FIG. 1a is a rear perspective view of an integrated mobile phone case and charger built in accordance with an embodiment of the present invention.
Figure 1B:
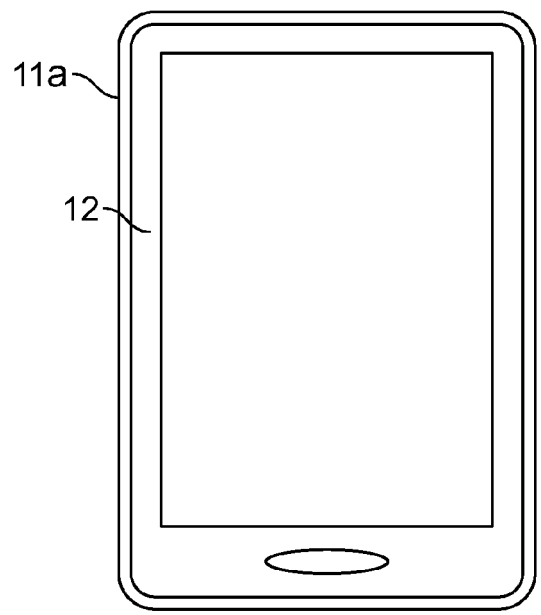
FIG. 1b is a front elevational view of an integrated mobile phone case and charger built in accordance with an embodiment of the present invention.
Figure 1C:
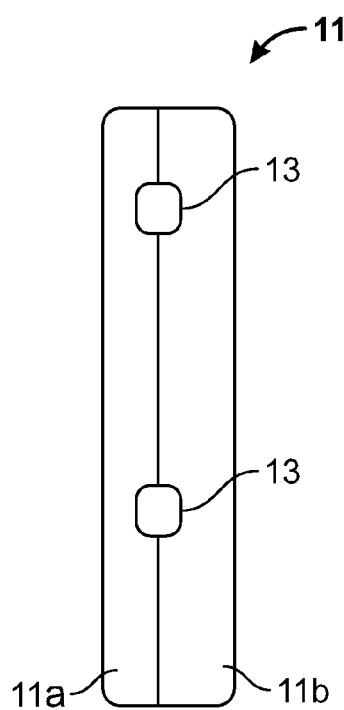
FIG. 1c is a side elevational view of an integrated mobile phone case and charger built in accordance with an embodiment of the present invention

Referring now to the drawings and in particular FIGS. 1a, 1b, and 1c, an integrated mobile phone case and charger 10 is shown having a case body 11 defined by a hard, canvassed rubber body having a front piece 11a and a back piece 11b. The front piece 11a and back piece 11b are configured to releasable attached to each other to form an enclosure in which a mobile phone 12 or other mobile device is placed and secured. The front piece 11a and the back piece are releasably attached to each other through the operation of a plurality of fasteners 13, defined in the preferred embodiment as a latch fastener having corresponding fastening portions on the front piece 11a and the back piece 11b. In this regard, the case body 11 is structured to be secured over a mobile device in a manner substantially similar to mobile device cases in the prior art.

The back piece 11b of the case body 11 additionally includes two solar cells 14 which are adapted to convert light energy into electrical energy. These solar cells 14 enable the integrated mobile phone case and charger 10 to generate its own electrical energy to be supplied to the battery of a mobile device disposed therein. While two solar cells 14 disposed on the back piece 11b are utilized in the preferred embodiment, it is contemplated that the integrated mobile phone case and charger 10 may alternatively operate with one solar cell 14 or three or more solar cells 14 disposed thereon.

Figure 2:
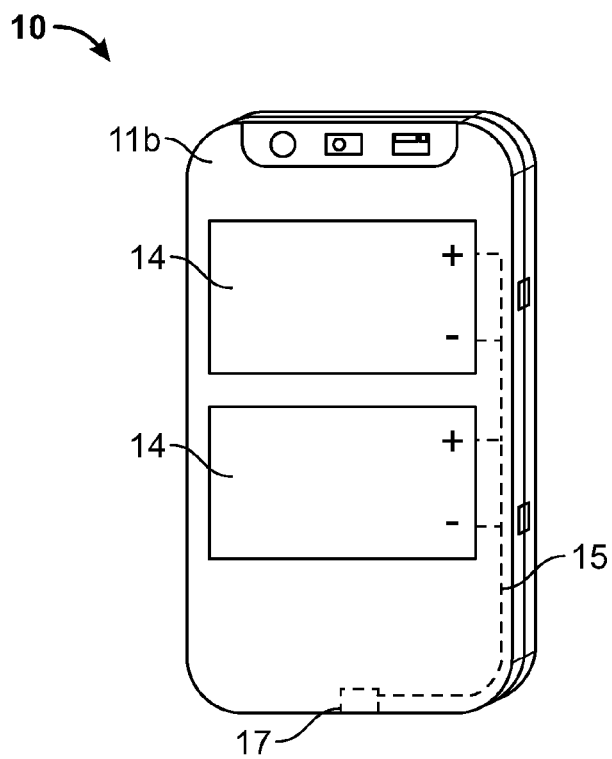
FIG. 2 is a back perspective view of the back piece of an integrated mobile phone case and charger built in accordance with an embodiment of the present invention with electrical wiring and a phone port in shadow.
Figure 3:
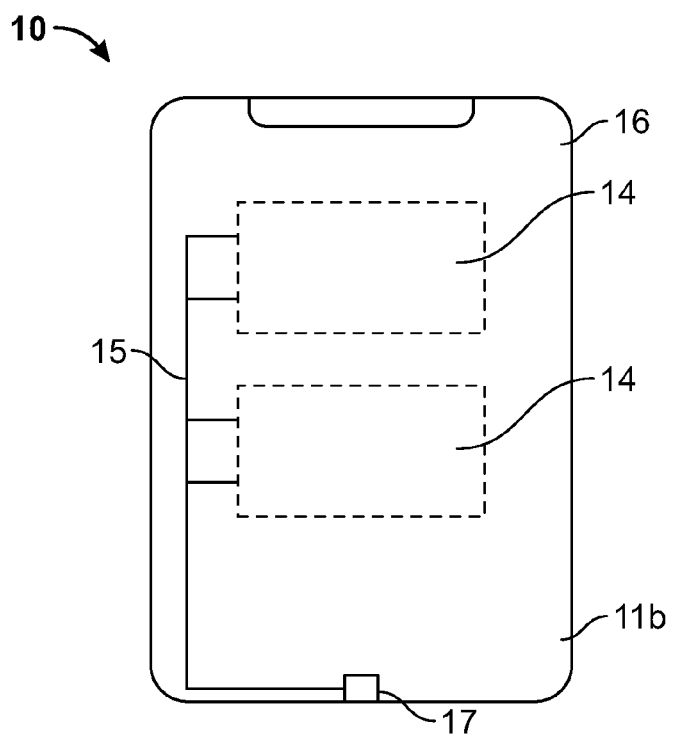
FIG. 3 is a front elevational view of the back piece of an integrated mobile phone case and charger built in accordance with an embodiment of the present invention.

Referring now to FIGS. 2 and 3, electricity generated by the solar cells 14 of the integrated mobile phone case and charger 10 and provided to a mobile device secured therein is carried through electrical wires 15 mounted on the inside surface 16 of the back piece 11b to a charging port 17. The inside surface 16 of the back piece 11 is the surface which contacts a mobile device mounted in the integrated mobile phone case and charger 10. In this regard, the electrical wires are not visible or accessible when the integrated mobile phone case and charger 10 is on a mobile device.

The charging port 17 is embodied as a conventional port through which the mobile device is configured to receive electrical power from a conventional battery charger. The charging port 17 is fixedly mounted on the inside surface 16. It is contemplated that as mobile devices are of many types of shapes and sizes, and are constructed with the outlets for a port through which electrical power is received in a variety of locations, the dimensions of the case body and the location of the charging port 17 of an integrated mobile phone case and charger 10 will differ for different models. But it is further contemplated that for mobile devices having a charging outlet at the bottom of the device, the charging port 17 for the integrated mobile phone case and charger 10 configured therefor will be disposed on the bottom of the inside surface 16.

It is contemplated that the solar cells 14 built in accordance with the present invention can be adapted to convert natural light and/or artificial light to electricity.

In an alternate embodiment, the charging port 17 will be configured to swivel slightly to lessen pressure placed on the charging port 17 and the charging outlet of a mobile device when the back piece 11b is installed or removed from the mobile phone.

Figure 4:
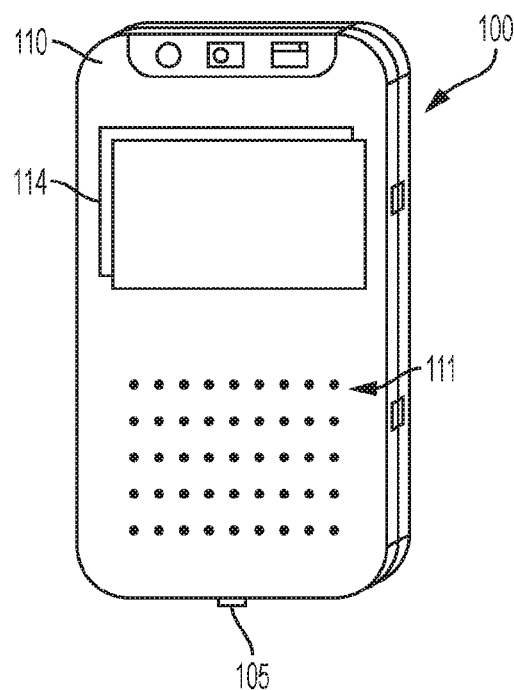
FIG. 4 is a back perspective view of the back piece of an integrated mobile phone case and charger built in accordance with an electronic embodiment of the present invention.
Figure 5:
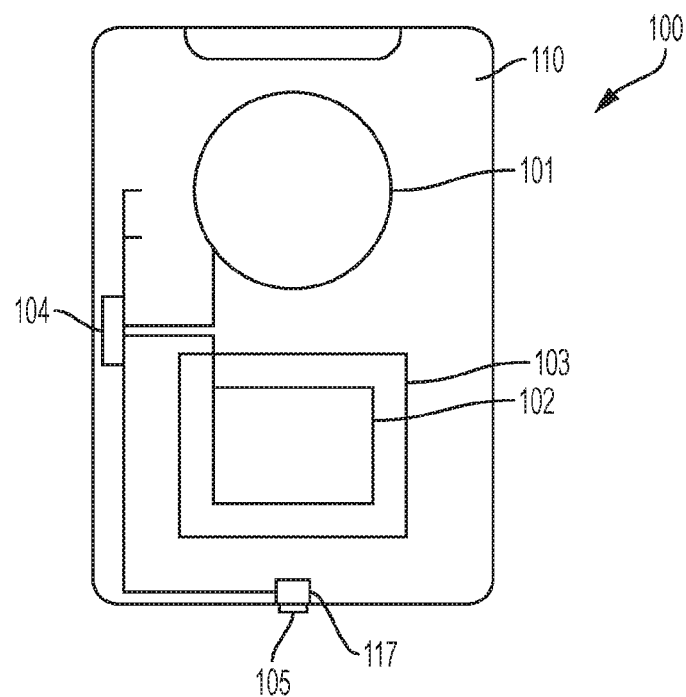
FIG. 5 is a front elevational view of the back piece of an integrated mobile phone case and charger built in accordance with an electronic embodiment of the present invention.

Referring now to FIGS. 4 and 5, an electronic embodiment of an integrated mobile phone case and charger 100 also includes a case body with a front piece and a back piece 110, just as the embodiment shown in FIGS. 1-3. In the electronics embodiment, however, the back piece 110 includes a section that is perforated 111. In addition, a solar cell component 114 that is adapted to covert light energy into electrical energy is disposed on the exterior side of the back piece 110 and an induction coil 101, a thermoelectric cooler 102, a heat sink 103, and an electronic control unit 104 disposed on the interior side of the back piece. In one implementation, the solar cell component 114 defines Perovskite solar cells in a tandem arrangement, the thermoelectric cooler 102 defines a Peltier device, and the heat sink 103 defines an aluminum (elemental or an alloy) sheet. The control unit 104 is electrically connected to the solar cell component 114, induction coil 101, thermoelectric cooler 102, and heat sink 103 and operative to selectively direct electricity generated by the solar cell component 114 to the induction coil 101 in order to facilitate inductive charging of the battery of a mobile device in the case body, the thermoelectric cooler 102 to enable cooling of such a mobile device, or to a physical charging port 117.

The control unit 104 additionally includes a wireless transceiver which allows it to connect to and exchange data with a mobile device in the case body. In one implementation, the wireless transceiver defines a Bluetooth or Zigbee antenna. Through a wireless connection to a mobile device in the case body, the control unit 104 is operative to monitor the status of, retrieve information from, and transmit commands to the mobile device and optimally direct the operation of the components of the integrated mobile phone case and charger 100 for charging and cooling. For example, the control unit 104 may retrieve information related to the temperature of the mobile device and battery level and adjust the amount of generated electricity that is directed to the thermoelectric cooler 102 or the induction coil 101/charging port 117 based on the specifics retrieved. In addition, the control unit 104 may determine whether to use the induction coil 101 or the charging port 117 to charge a contained mobile device by determining whether the contained mobile device includes an operational receiver induction coil. It is contemplated that this could be determined by providing generated electricity to the induction coil 101 while simultaneously retrieving from the contained mobile device an indication of whether the mobile device is charging. If it was, electricity would be continued to be supplied to the induction coil 101 while if it was not, electricity would alternatively be supplied to the charging port.

While the charging port 117 is similar to the charging port described with FIGS. 1-3, in some embodiments, it may include additionally an external female outlet 105 that is accessible from the exterior of the case body and can receive a male charger connector (not shown) from a discrete device to allow a mobile device in the case body to be charged through a conventional wired charger without removing the mobile device from the mobile phone case and charger 100 or the removing the charging port 117 from the charging outlet on the mobile device.

In some embodiments, it is contemplated that the control unit 104 includes software stored thereon which includes instructions which allow the processor to perform the operations of creating/managing a user profile and automatically contacting emergency alerts to designated contacts in a user profile when a mobile device turns off due to loss of battery power.

Figure 6:
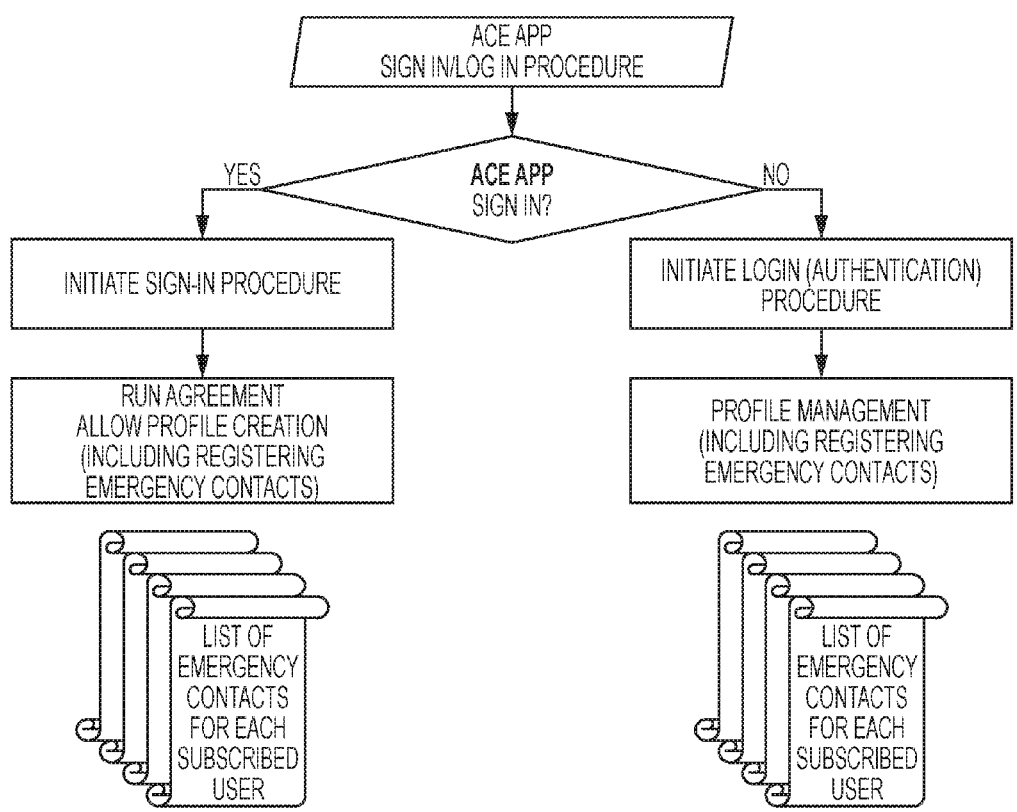
FIG. 6 shows the process through which a sign in/log in proceeds in accordance with an electronic embodiment of the present invention.

Referring now to FIG. 6, the creation/management of a user profile is controlled through an automatic contacting in emergency ("ACE") software application. It is contemplated that the ACE software application defines in some embodiments software that is downloadable to a mobile device and which operates on the mobile device. Upon launching, the ACE software application requires a user to either register an account and ultimately designate at least one emergency contact or log in to an existing account and make additions, deletions or modification to previously designated emergency contacts. It is appreciated that emergency contacts would typically define contacts stored on the mobile device that a user desires to receive an alert in the event of an emergency. Once operational, the ACE software application enables the mobile device to a communicate data with a remote server that could assist in solar charging and in contacting emergency contacts.

Figure 7:
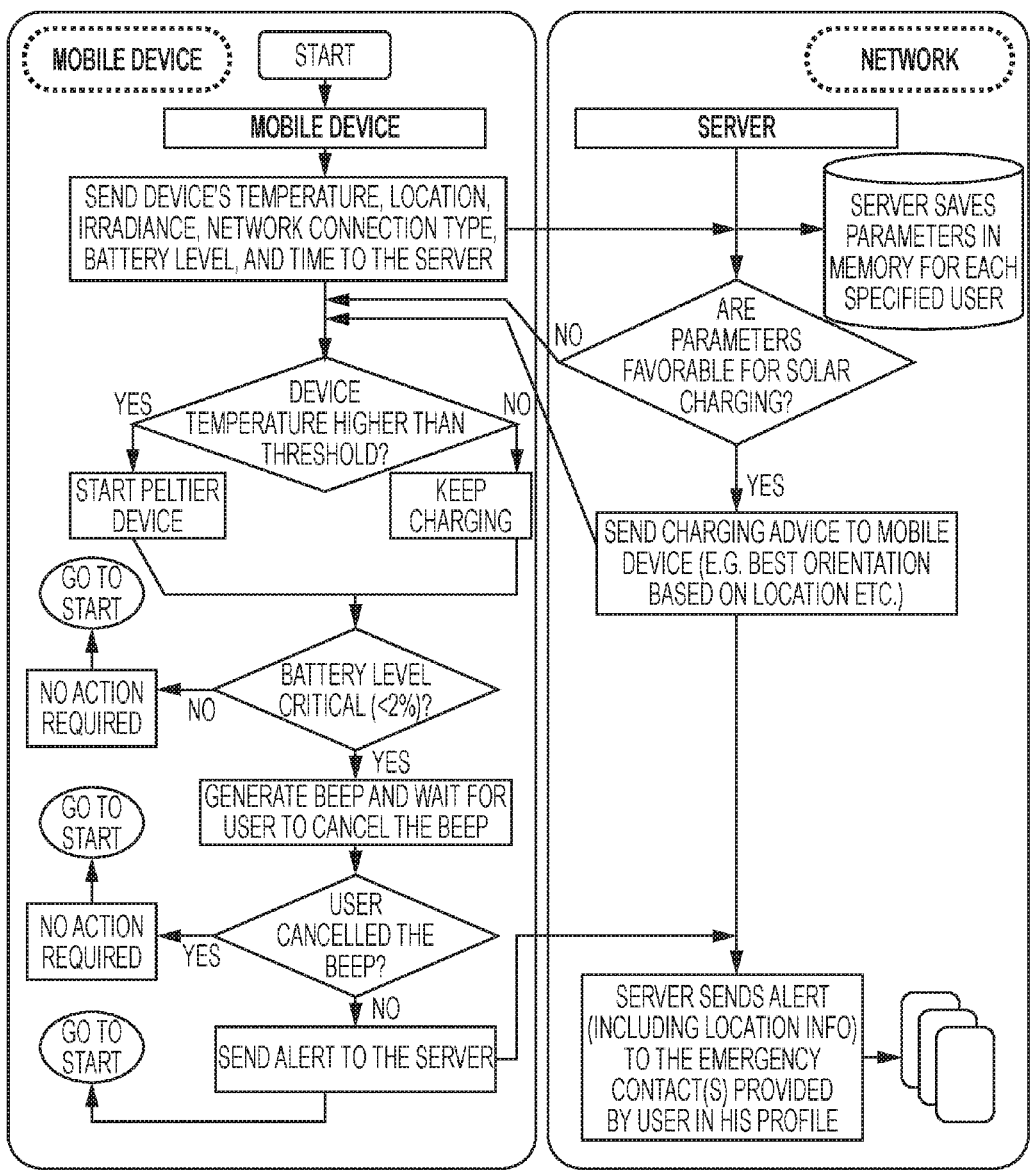
FIG. 7 shows the process through which a mobile device communicates with a remote server over a network in accordance with an electronic embodiment of the present invention.

Referring now to FIG. 7, once a user has been logged in on the ACE software application, the mobile device housing the ACE software begins communicating information to the remote server concerning matters relating the mobile device. In some embodiments, this information includes the devices temperature, location, irradiance, network connection type, battery level, and time to server. In addition, if the contact information for the designated emergency contacts had not been previously provided or was changed, the up to date information for the designated emergency contacts would be sent to the server. Using the location information sent by the mobile device, the server may communicate information relating to the favorability of solar charging and the optimization of the same.

Through the operation of the control unit on the integrated mobile phone case and charger, charging and cooling of the mobile device is managed. But once the battery level reaches a critical point, a notification is generated on the mobile device. If this notification is not acknowledged, the mobile device then immediately communicates to the server an alert that includes the location of the mobile device to the server. Using this information, the server transmits to each (or one preferred) designated emergency contact an emergency alert. In some embodiments, the mobile device may additionally attempt to send such an emergency alert directly to each designated emergency contact prior to losing the remaining charge.

In an embodiment, the integrated mobile phone case and charger includes a thermoelectric cooler and induction coil that are wired such that current passing through the induction coil also passes the Peltier device. In such an embodiment, cooling and charging functions are performed at the same time.

In an embodiment, the once the control unit has been bonded with and connects with a particular a mobile device in the case body, it becomes permanently associated with that particular mobile device. Accordingly, in such an embodiment, the features of the control unit on the integrated mobile phone case and charger become disabled if it is attempted to use the integrated mobile phone case and charger on another mobile device.

In another embodiment, Piezoelectric material may be used on both sides of the case to generate Piezoelectricity through hand vibration to charge the mobile device sufficiently to make at least an emergency call. It is appreciated that the piezoelectric effect is the ability of certain materials to generate an AC (alternating current) voltage when subjected to mechanical stress or vibration.

In yet another embodiment, Piezoelectric material on the case may be coated with a malleable gel or clay to give it slight softness, similar to conventional stress balls. In such an embodiment, the Piezoelectric material not only operates to charge the phone, but also acts as a stress reliever (person in an emergency is obviously in stress). It may further (a) boost blood circulation, (b) help with the treatment of carpal-tunnel syndrome (used as a tool for meditation), and (c) help strengthen the muscles of the hand and wrist.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An integrated mobile phone case and charger, comprising:
   a case body is configured to be secured around a mobile device, wherein said case body includes a front piece and a back piece configured to releasably attach to each other to enclose a mobile phone;
   said back piece having an inside surface configured to be positioned adjacent to the mobile device disposed in said case body and an exterior surface defining the side of the back piece opposite the inside surface;
   at least one solar cell disposed on said exterior surface;
   at least one thermoelectric cooler integral with said inside surface, wherein said at least one thermoelectric cooler is oriented to transfer heat towards the exterior surface; and
   an electronic control unit integral with said case body, wherein said control unit is electrically connected to said at least one solar cell and the at least one thermoelectric cooler so as to enable electricity generated by the at least one solar cell to be supplied to the at least one thermoelectric cooler, thereby adapting the control unit to cause heat to be transferred away from the mobile device disposed in said case body.

2. The integrated mobile phone case and charger of claim 1, additionally comprising a heat sink disposed on said inside surface, wherein the heat sink is positioned between the at least one thermoelectric cooler and the exterior surface.

3. The integrated mobile phone case and charger of claim 2, wherein said back piece includes a perforate section adjacent to said heat sink.

4. The integrated mobile phone case and charger of claim 1, wherein said back piece includes a perforate section adjacent to said at least one thermoelectric cooler.

5. An integrated mobile phone case and charger, comprising:
- a case body is configured to be secured around a mobile device, wherein said case body includes a front piece and a back piece configured to releasably attach to each other to enclose a mobile phone;
- said back piece having an inside surface configured to be positioned adjacent to the mobile device disposed in said case body and an exterior surface defining the side of the back piece opposite the inside surface;
- at least one solar cell disposed on said exterior surface;
- at least one thermoelectric cooler integral with said inside surface, wherein said at least one thermoelectric cooler is oriented to transfer heat towards the exterior surface;
- at least one of an integrated charging port mounted to said case body and an induction coil disposed on said inside surface; and
- an electronic control unit integral with said case body, wherein said control unit is electrically connected to said at least one solar cell, the at least one of the integrated charging port and induction coil, and the at least one at least one thermoelectric cooler so as to enable electricity generated by the at least one solar cell to be supplied to the at least one thermoelectric cooler and supplied to the at least one of the integrated charging port and induction coil, thereby adapting the control unit to direct electricity generated by the at least one solar cell to the mobile device disposed in said case body and to cause heat to be transferred away from the mobile device disposed in said case body.

6. The integrated mobile phone case and charger of claim 5, wherein said control unit and said charging port are disposed on said back piece.

7. The integrated mobile phone case and charger of claim 6, wherein said control unit and said charging port are disposed on said inside surface.

8. The integrated mobile phone case and charger of claim 5, wherein said case body includes the integrated charging port mounted to said case body and the induction coil disposed on said inside surface.

9. The integrated mobile phone case and charger of claim 8, wherein said control unit is adapted to selectively provide electricity to either the integrated charging port or the induction coil depending on whether the inductive charging is possible.

10. The integrated mobile phone case and charger of claim 5, wherein said at least one solar cell defines a Perovskite solar cell in a tandem arrangement.

11. The integrated mobile phone case and charger of claim 5, additionally comprising a heat sink disposed on said inside surface, wherein the heat sink is positioned between the at least one thermoelectric cooler and the exterior surface.

12. The integrated mobile phone case and charger of claim 11, wherein said back piece includes a perforate section adjacent to said heat sink.

13. The integrated mobile phone case and charger of claim 5, wherein said back piece includes a perforate section adjacent to said at least one thermoelectric cooler.

\* \* \* \* \*